United States Patent [19]

Hastings

[11] Patent Number: 4,466,737

[45] Date of Patent: Aug. 21, 1984

[54] APPARATUS AND METHOD FOR EXPOSING A SENSITIZED BASE

[76] Inventor: Lynford Hastings, 1817 E. Valley Rd., Kent, Wash. 98031

[21] Appl. No.: 420,816

[22] Filed: Sep. 21, 1982

[51] Int. Cl.³ .............................................. G03B 27/10
[52] U.S. Cl. ............................................ 355/84; 355/8
[58] Field of Search ........................... 355/84, 8, 76, 78

[56] References Cited

U.S. PATENT DOCUMENTS 3,723,001 3/1973 Zeunen et al. ......................... 355/84
4,182,569 1/1980 Smith ..................................... 355/84
4,377,337 3/1983 Beck .................................. 355/84 X Primary Examiner—Richard A. Wintercorn
Attorney, Agent, or Firm—T. W. Secrest

[57] ABSTRACT

This invention is directed to an apparatus and method for transferring the outline of a drawing to a copy sensitive base. In the transferring of the drawing there is employed a uniform intensity of light to have a uniform transfer of the drawing to the copy base without hot spots on the drawing. The size of the drawing and the copy base can be any reasonable size such as fifty feet by fifty feet.

18 Claims, 32 Drawing Figures

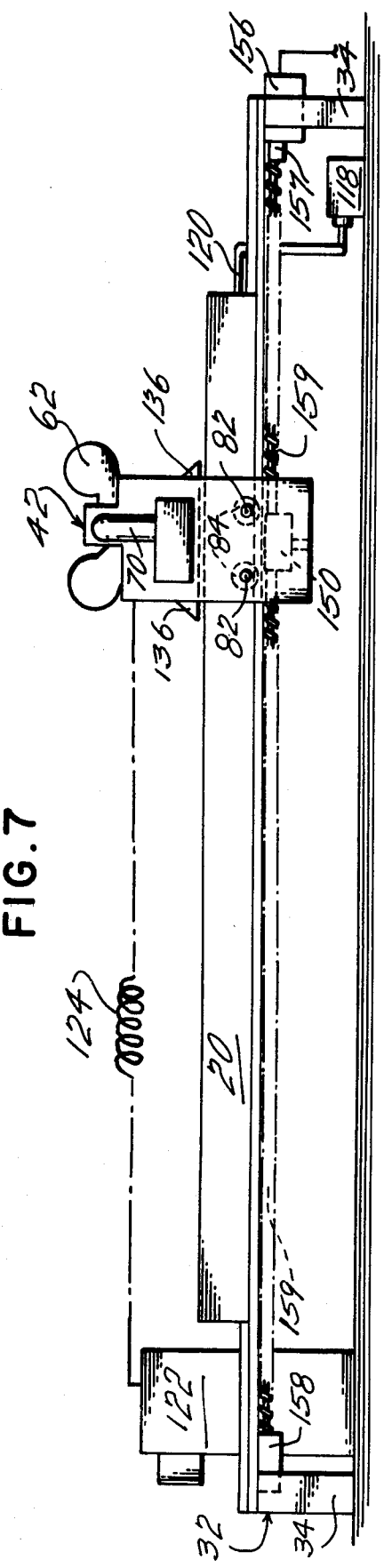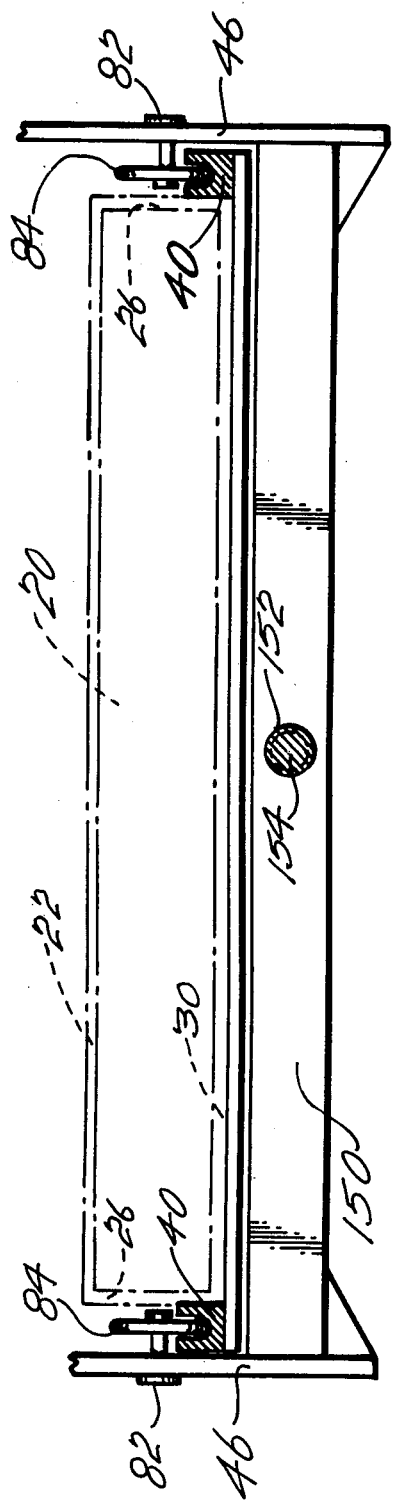
FIG.7
FIG.8

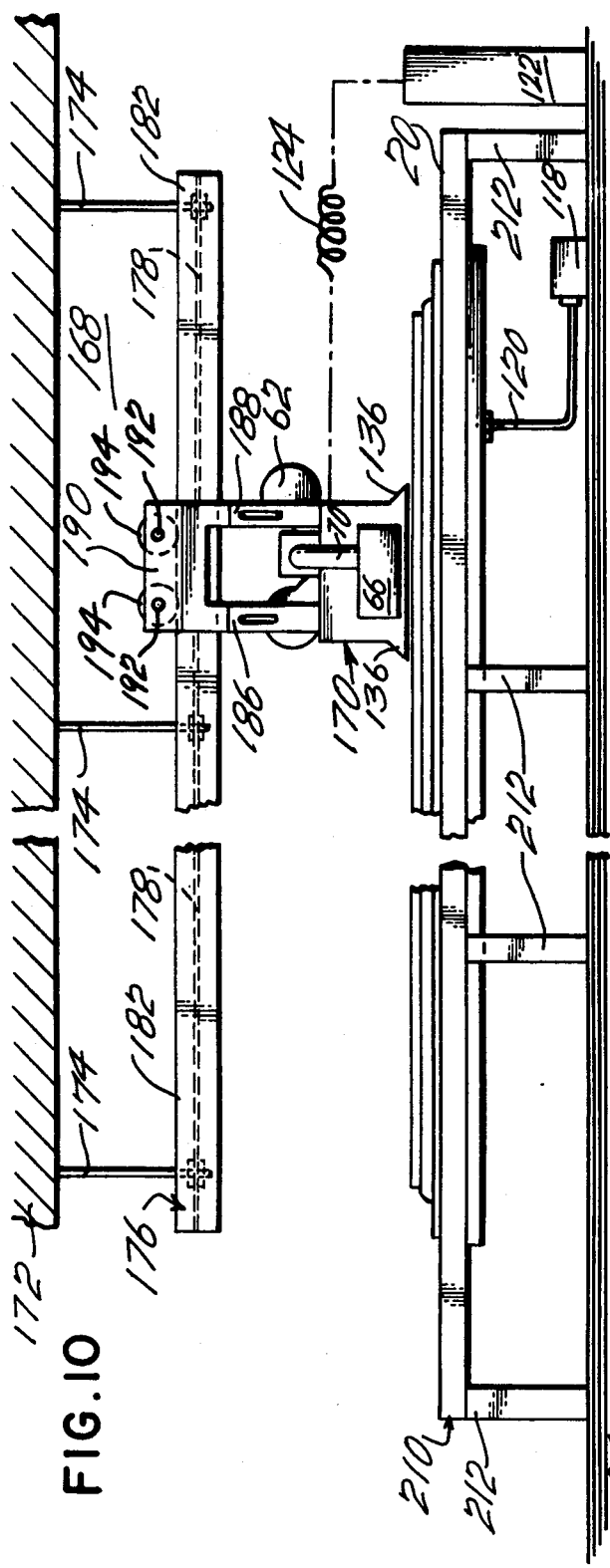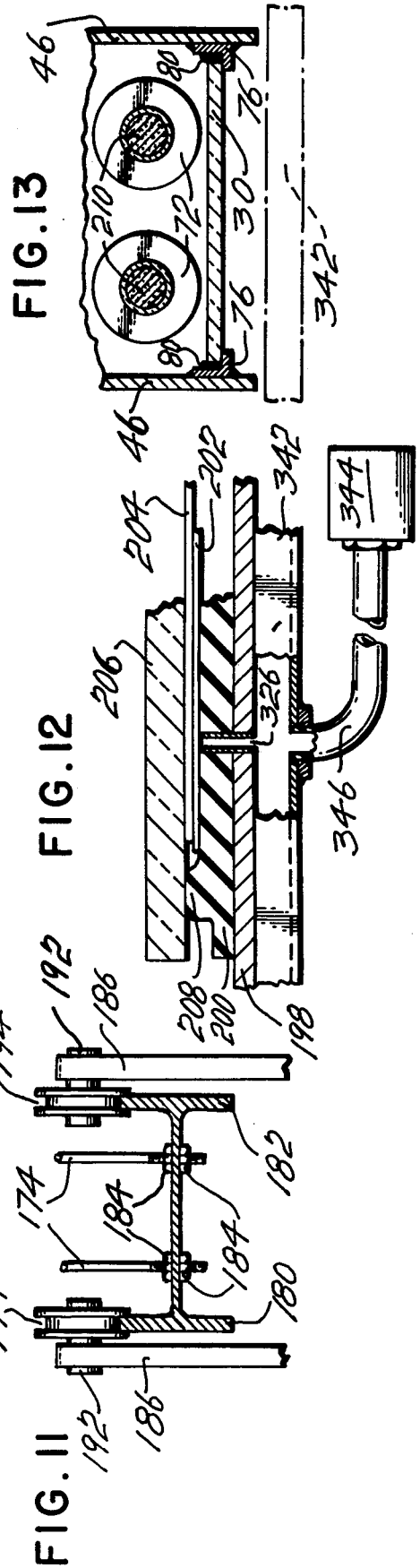

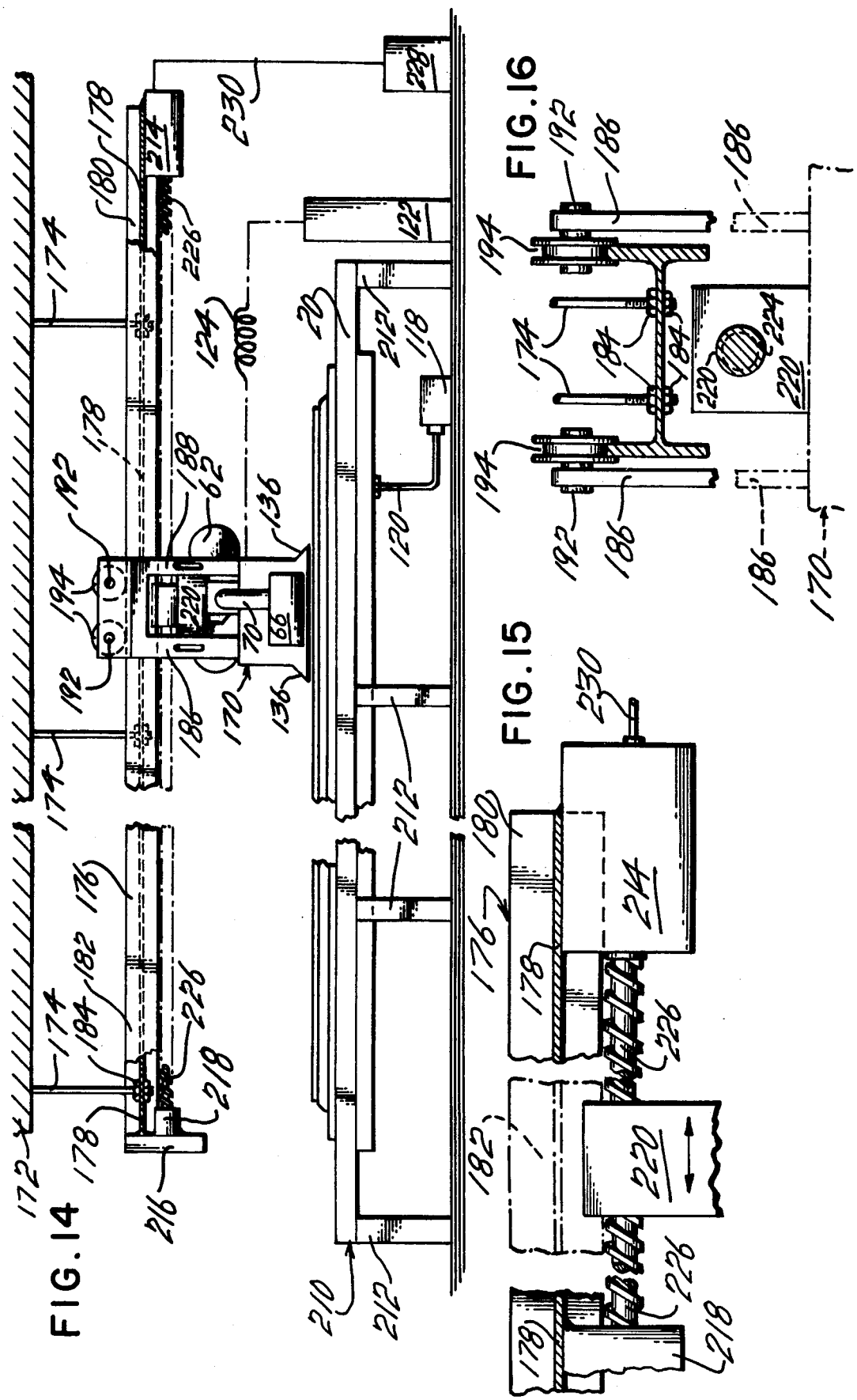

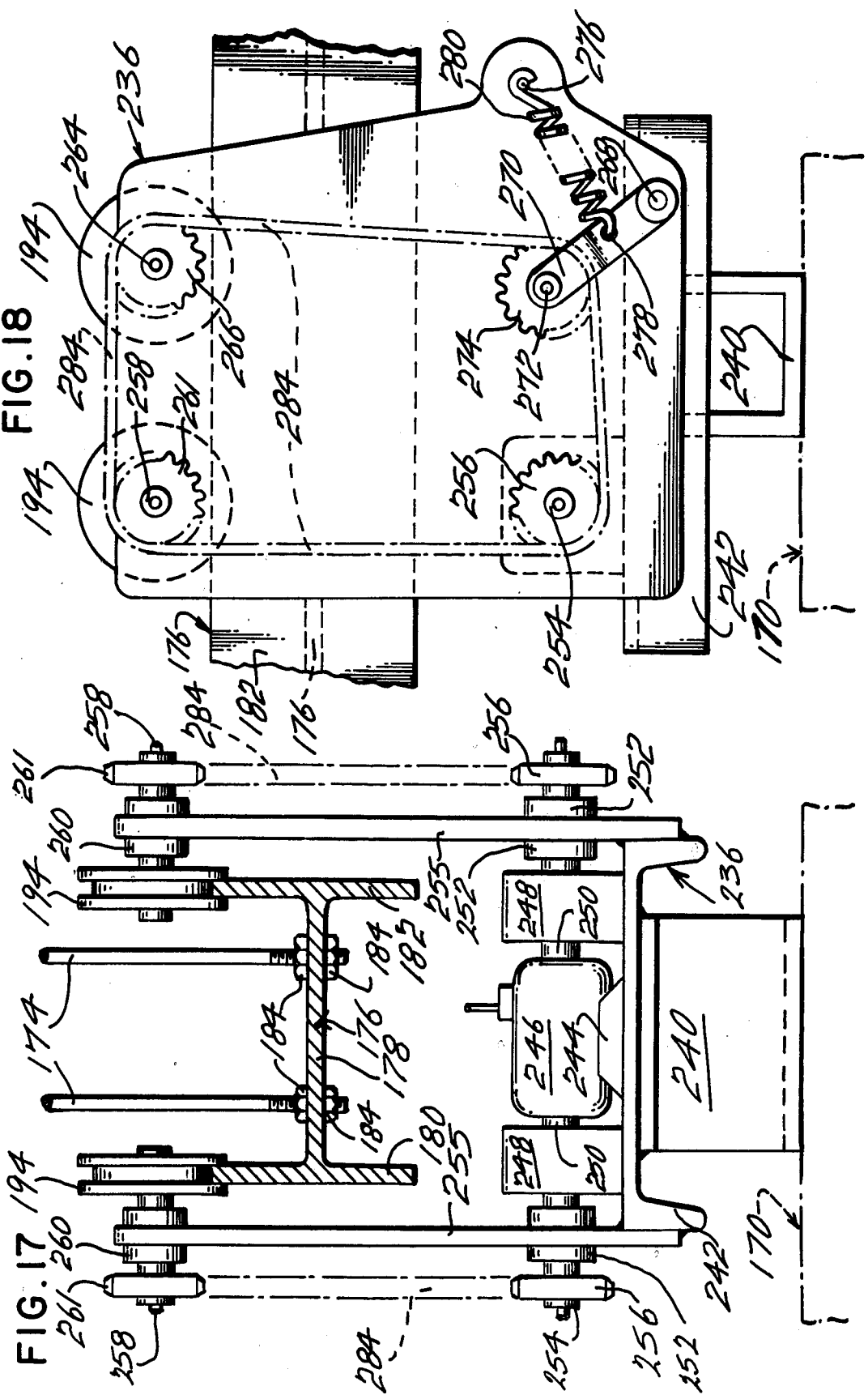

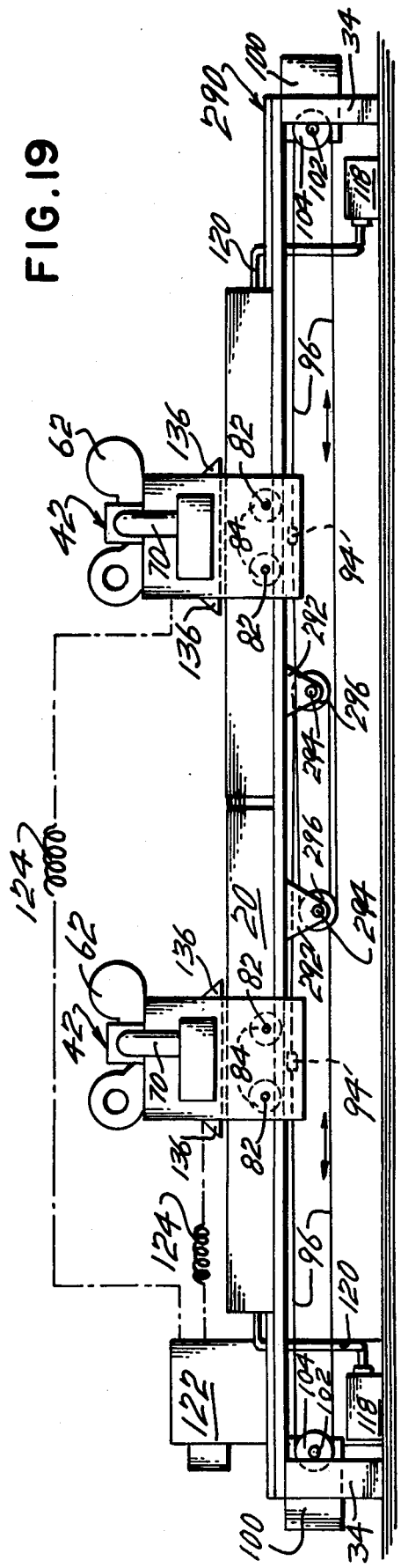
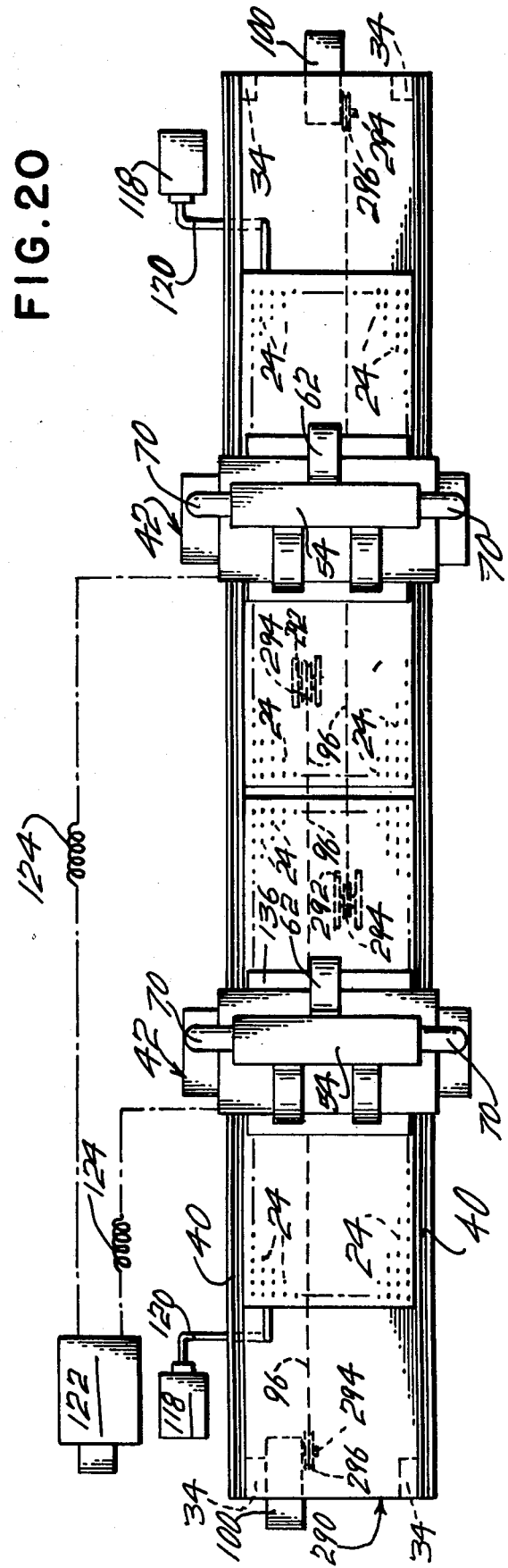
FIG.19
FIG.20

APPARATUS AND METHOD FOR EXPOSING A SENSITIZED BASE

THE BACKGROUND OF THE INVENTION

A drawing is often copied for engineering, architectural and other lines of endeavor. The copying of drawings has been done for many years. Almost everyone is familiar with the copying of a drawing to make a blueprint. For example, in the construction of a building blueprints are prepared to assist the contractor and the artists to construct the building according to plan. The same can be said with respect to the making of a boat, a trailer, a farm implement, furniture and the like.

A well-known form of copying is with a blueprint. An engineering firm and an architectural firm have blueprint machines. The drawing and the sensitized copy base are placed in an overlying relationship. Then, the drawing and the copy base are moved around a curve or a roller and exposed to a high intensity light. The combination of the drawing and the copy base move so as to fold back on themselves. The copy of the drawing on the copy base or on the sensitized base is not a true copy of the drawing. The copy of the drawing is distorted because of the travel of the drawing and the copy base around the curve or roller.

Another manner of making a copy of a drawing is to place the drawing on the copy base flat. The drawing and the copy base overlie each other. There is used a number of lights for exposing the copy base. With the number of lights it is not possible to secure an even distribution of the light rays. As a result there appear to be hot spots on the copy base or the exposed base. These hot spots result in an uneven exposure of the copy base and an uneven blueprint. Also, the size of the copy is limited by the size of the frame which can receive the drawing and the copy base. Most frames are not large frames and therefore most drawings and copies are restricted in size. The light should have the same time of exposure. If one light fails then it is necessary to replace all of the lights so that all of the lights have the same kind of exposure. If all of the lights have the same time of exposure then there is a better opportunity for more even distribution of light. As is realized many lights are expensive and many lights use considerable electricity.

GENERAL DESCRIPTION OF THE INVENTION

This invention comprises a stationary support. A copy base can be placed on the stationary support. A copy base is, normally, sensitized paper. Then, a drawing can be placed over the copy base. The copy base and the drawings are in a flat configuration. A light source passes over the drawing and the copy base so as to expose the copy base. Then the copy base can be developed to have a copy of the drawing. There is used in the light source one light. It is not necessary to have a plurality of lights in the light source. With the use of one light there is used less electricity. Further, with my invention it is possible to have a drawing of any reasonable size. A drawing 20 feet long and 10 feet wide is not unreasonable. It is conceivable that the drawing can be 50 feet long and 20 feet wide and still be reasonable. The structure of this invention is such that a drawing of any reasonable size can be copied. At the present time the copying of a drawing 20 feet long and 10 feet wide with commercially available copying equipment is not possible. To the best of my knowledge, the copying equipment of this invention is the only equipment capable of copying a drawing 50 feet long and 20 feet wide.

Also, the light source can be made portable so as to be removed to a remote distance from the support until needed. Then, when the light source is needed, it can be brought to the support. After use the light source can be removed from the support. In fact, for the smaller version of the support the support can be portable and the light source can be portable. For the larger version of the support the support will be stationary and the light source will be so positioned with respect to the support that the light source will be restricted to travel over the support and thereby be restricted to the support and not be capable of moving away from the support.

THE DRAWINGS

Figure 3:
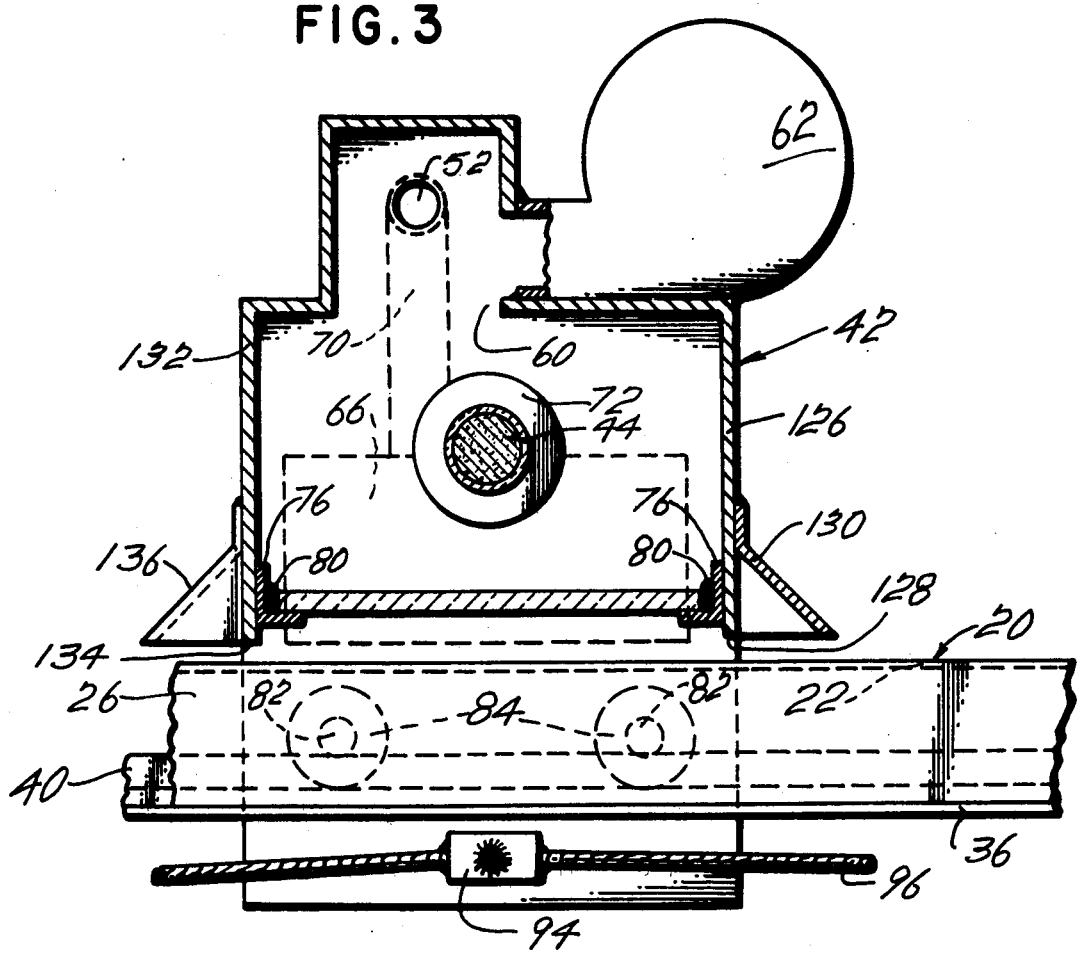
Figure 4:
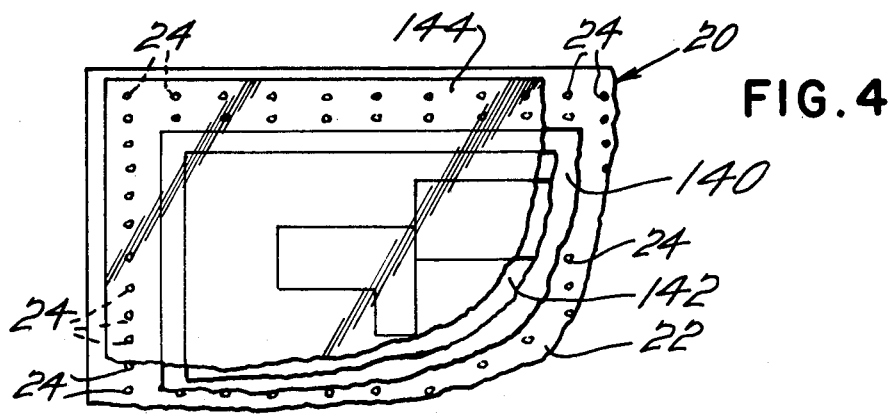
Figure 5:
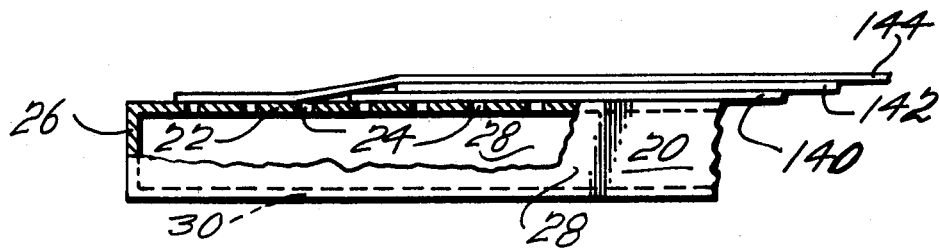
Figure 6:
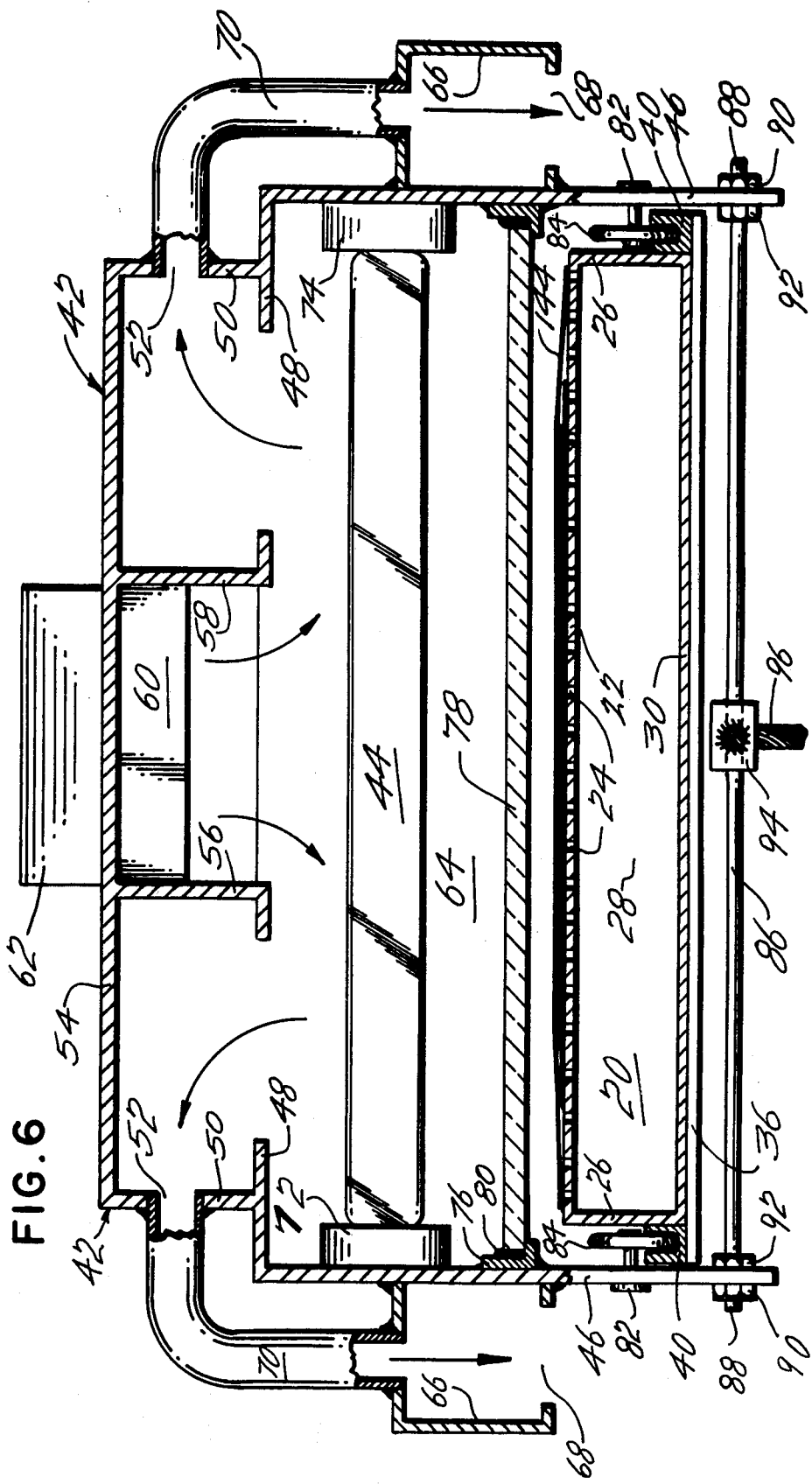
Figure 9:
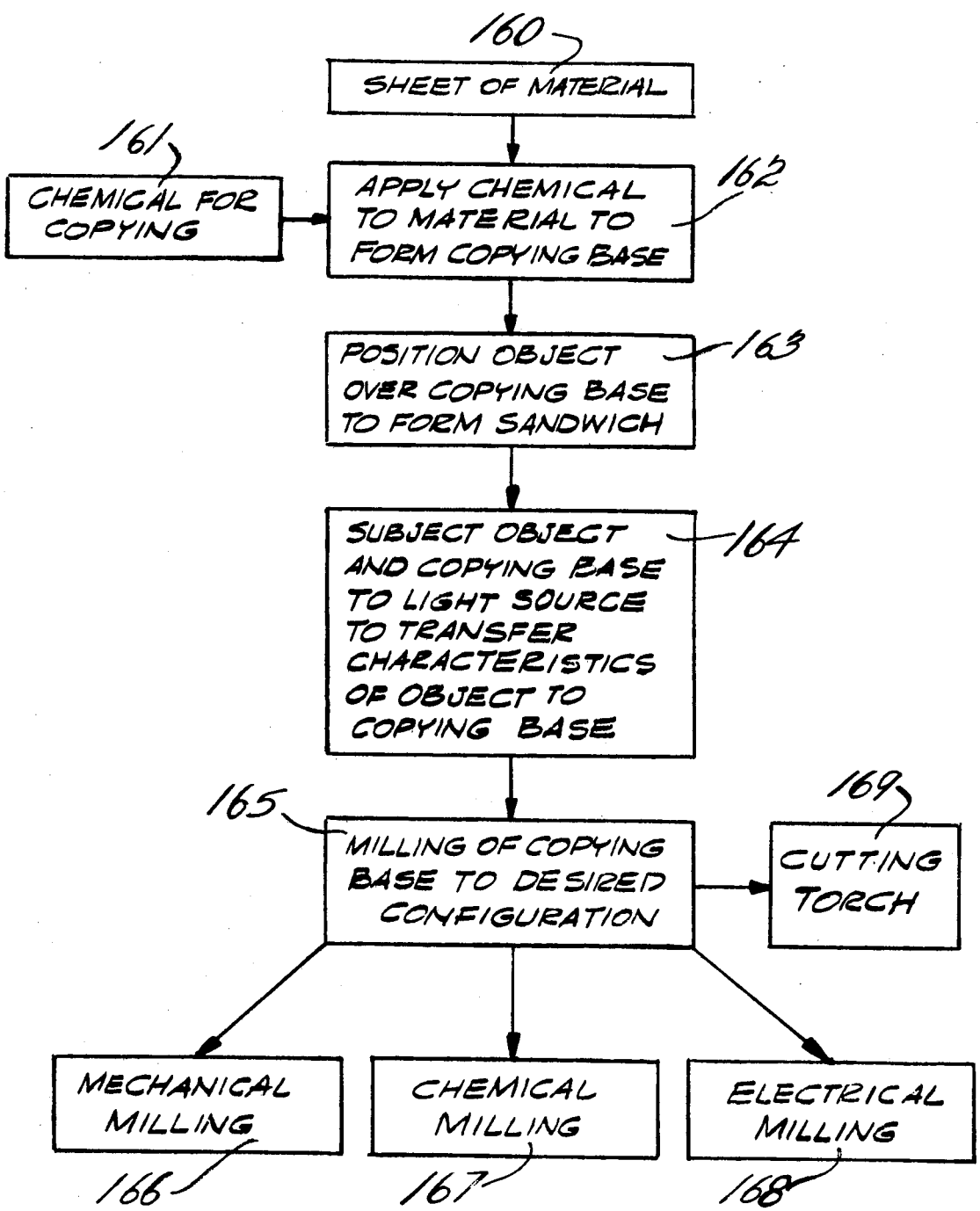
Figure 21:
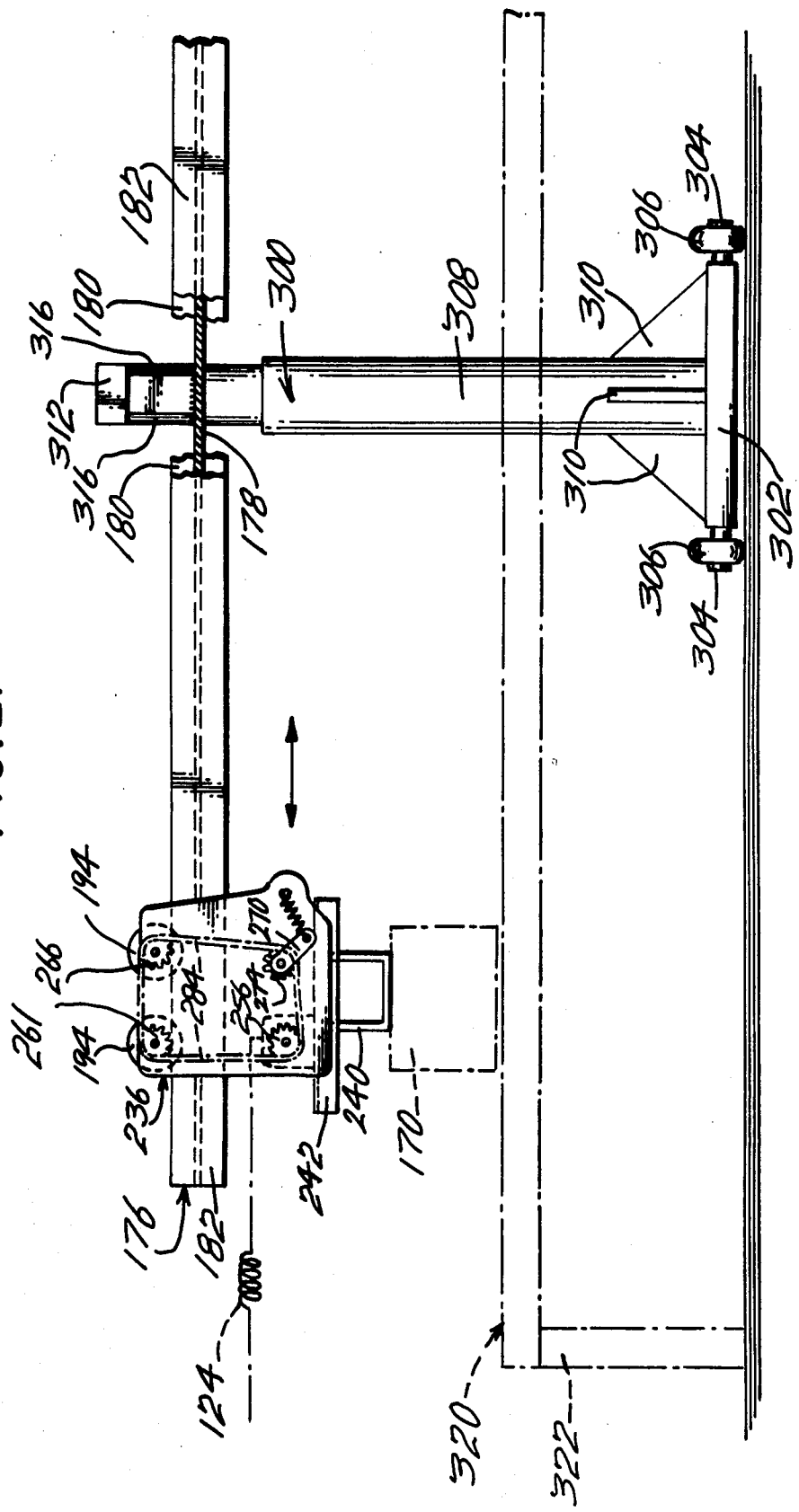
Figure 22:
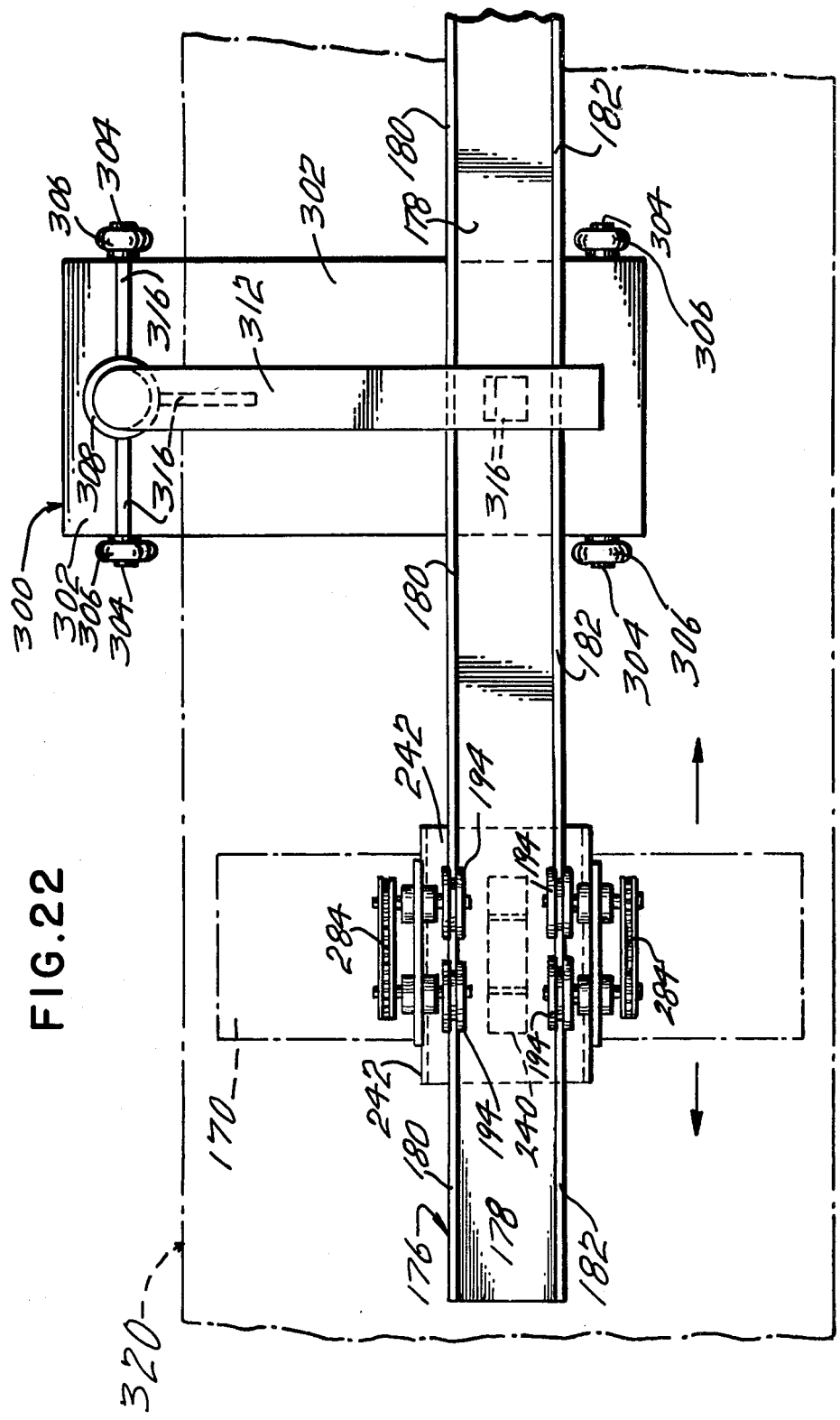
Figure 24:
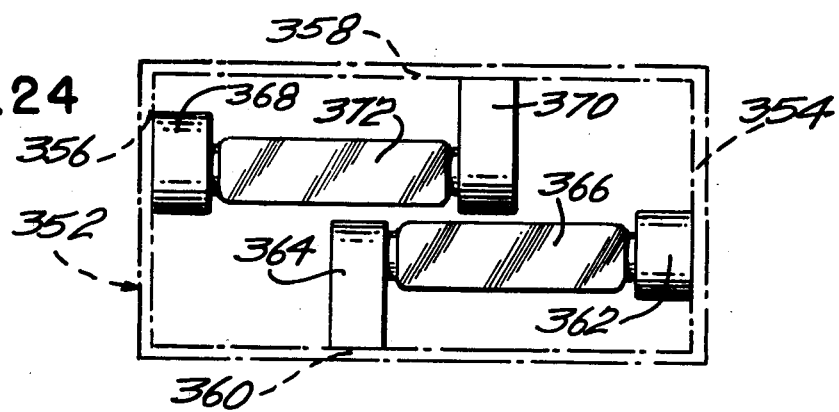
Figure 23:
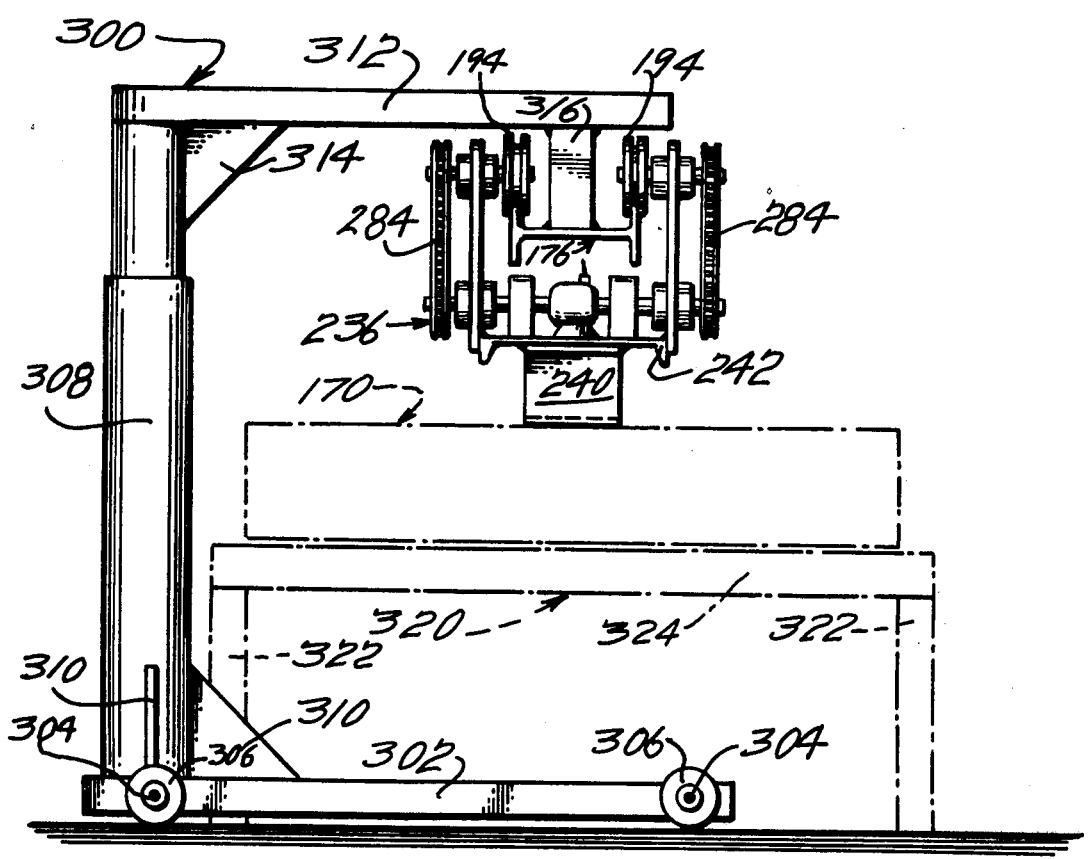
Figure 25:
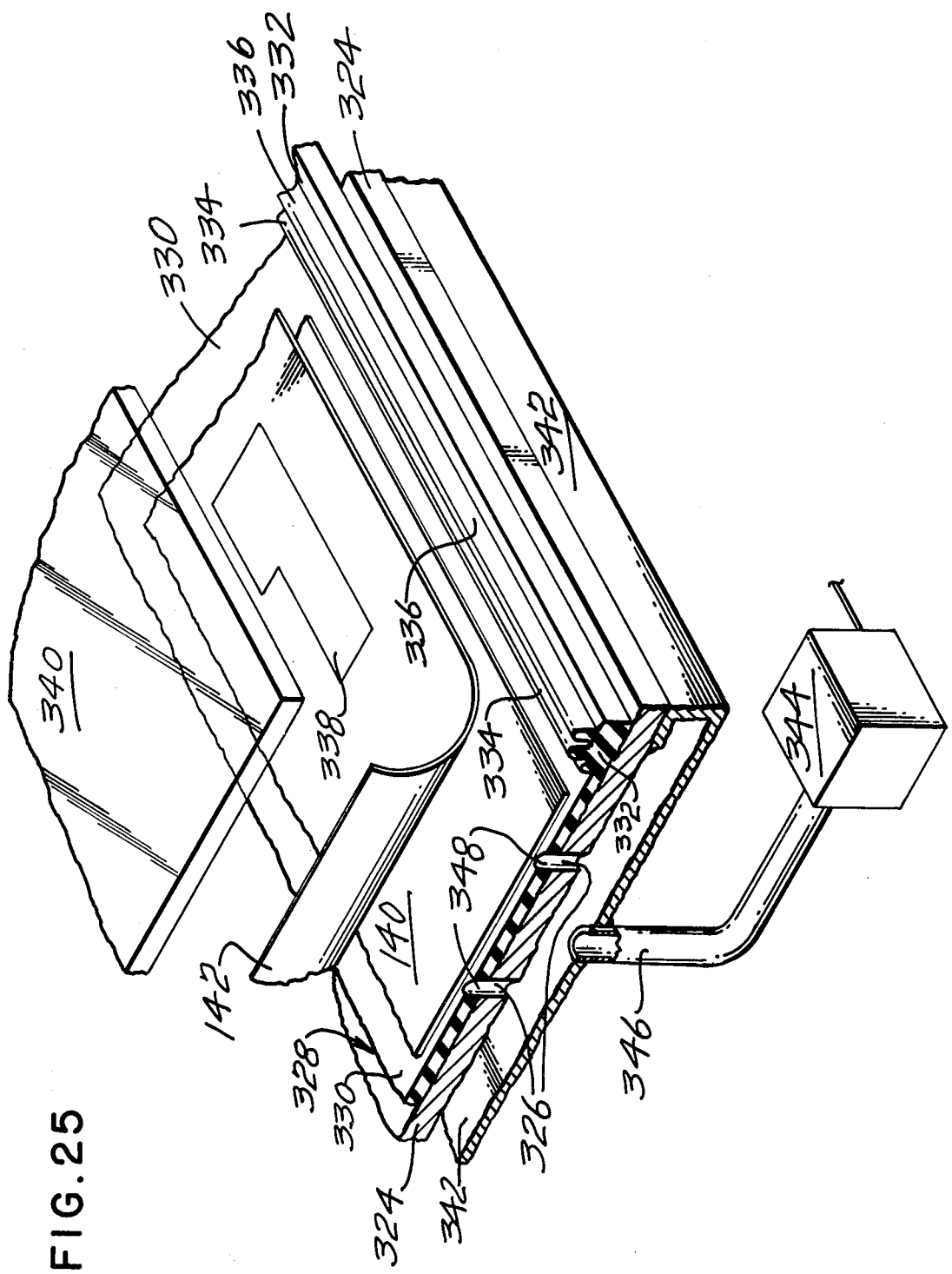
Figure 26:
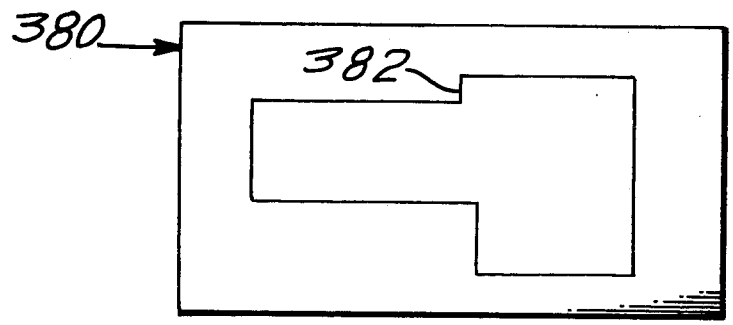
Figure 27:
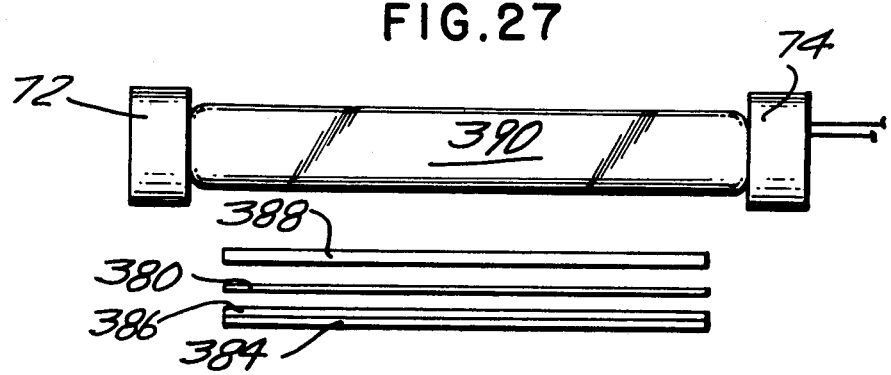
Figure 28:
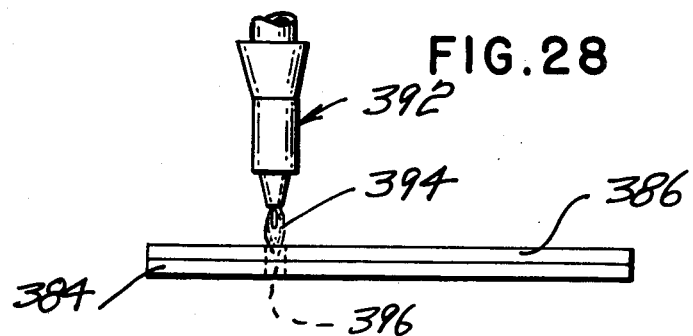
Figure 29:
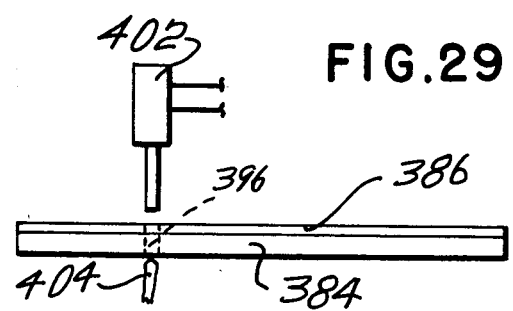
Figure 30:
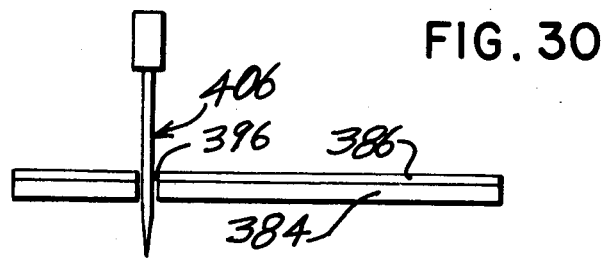
Figure 31:
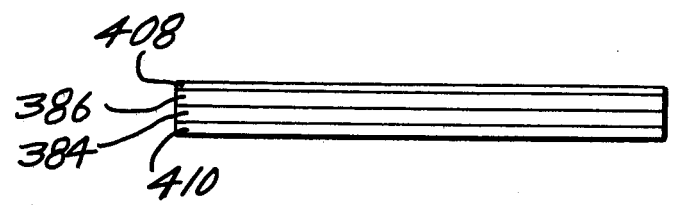
Figure 32:
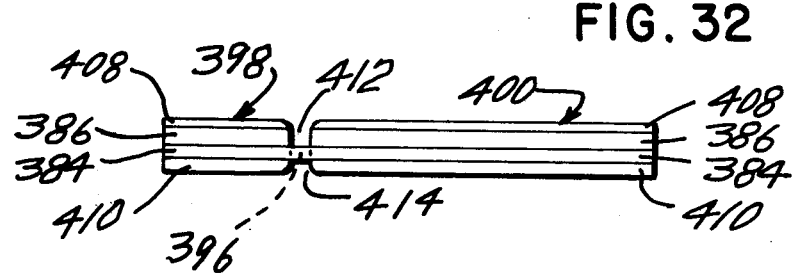

FIG. 3, on an enlarged scale, is a vertical cross-sectional view of the light source positioned on the support;

FIG. 4, on an enlarged scale, is a fragmentary view of the support, the light sensitive copy base, the drawing and the translucent cover;

FIG. 5, on an enlarged scale, is an end elevational view illustrating the support, the light sensitive copy base, the drawing and the translucent cover;

FIG. 6, on an enlarged scale, is a vertical cross-sectional view of the moving light source and illustrates the interior of the light source and the means for cooling the light in the light source and also the guide means for guiding the rectlinear movement of the moving light source over the support, the light sensitive copy base, the drawing and the translucent cover;

FIG. 7 is a side elevational view of another species of the invention and illustrates a long screw for moving the light source over the support, the drawing and the light sensitive copy base;

FIG. 8, on an enlarged scale, is a lateral cross-sectional view of the species of FIG. 7 and illustrates the screw for moving the light source and also the guides for guiding the rollers and the moving light source over the support, the drawing and the light sensitive copy base;

FIG. 9 is a flow diagram for transferring a drawing to a material such as a sheet of metal;

FIG. 10 is a side elevational view of another species of the invention and illustrates the moving light source positioned on an overhead suspension system and capable of being moved with respect to the support for the drawing and the light sensitive copy base;

FIG. 11, on an enlarged scale, illustrates the overhead suspension system, the flanged wheels riding on the legs of the overhead support and the supporting wall for supporting the moving light source;

FIG. 12, on an enlarged scale, is a fragmentary vertical cross-sectional view illustrating a vacuum table having a support, a flexible base, a light sensitive copy base, a drawing and a translucent cover;

FIG. 13 is a fragmentary lateral vertical cross-sectional view illustrating a light source having two parallel lights;

FIG. 14 is a fragmentary side elevational view of a first species of an overhead suspension system and moving system for moving a light source over a support, a light sensitive copy base and a drawing;

FIG. 15, on an enlarged scale, is a fragmentary view of part of the apparatus of FIG. 14 and shows the motor and gear box, a bearing and a screw for moving the moving light source on the overhead suspension system;

FIG. 16 is a lateral cross-sectional view of the apparatus of FIG. 14 and illustrates the overhead suspension system comprising an I-beam support, the flanged wheels for resting on and moving on the I-beam support, and the depending light source with the screw for moving the depending traveling light source;

FIG. 17 is a fragmentary lateral cross-sectional view of a second species of an overhead suspension system for a moving light source and illustrates an I-beam, flanged wheels for resting and moving on the I-beam, and the apparatus for rotating the flanged wheels to move the depending traveling light source;

FIG. 18 is a fragmentary side elevational view illustrating the traveling carriage and the depending traveling light source as positioned on the I-beam of the overhead suspension system of FIG. 17;

FIG. 19 is a side elevational view of another species of the apparatus and illustrates two moving light sources for moving over the support, the light sensitive copy base and the drawing;

FIG. 20 is a planned view of the species of FIG. 19 and illustrates the two moving light sources for exposing the light sensitive copy base;

FIG. 21 is a side elevational view of a traveling carriage and depending moving light source on a movable portable platform having an overhead I-beam for supporting the traveling carriage and the depending moving light source;

FIG. 22 is a top plan view of the apparatus of FIG. 21 and illustrates the moveable portable platform, the I-beam supported on the moveable platform and the traveling carriage for supporting the depending moveable light source;

FIG. 23 is an end elevational view of the moveable portable platform, the I-beam and the traveling carriage supported on the I-beam and the depending movable light source supported on the traveling carriage;

FIG. 24 is another species of a light source having two overlapping lights instead of one long light;

FIG. 25 is an exploded fragmentary perspective view illustrating a vacuum table comprising an airtight housing capable of having compressable ridges, a light sensitive copy base, a drawing and a cover glass for fitting over the flexible base, the light sensitive copy base and the drawing;

FIG. 26 is a view of a drawing having a design;

FIG. 27 is an end elevational view of a base or substrate comprising a sheet of material, light sensitive material on the base, a drawing over the light sensitive material, a cover over the drawing and a moveable source of light whereby the length of the light is greater than the width of the light sensitive material;

FIG. 28 is an end elevational view illustrating the sheet of material having on its upper surface the light sensitive material which has been exposed and a cutting torch for cutting out the design on the light sensitive material on the sheet of material;

FIG. 29 is an end elevational view showing the sheet of material with the sensitized base on the upper surface and two electrodes for removing part of the sheet of material to form the design of the drawing of FIG. 26;

FIG. 30 is an end elevational view showing the sheet of material with the light sensitive material on its upper surface and a severing means for cutting the sheet of material to the design of FIG. 26;

FIG. 31 is an end elevational view of the base or sheet of material having light sensitive material on its upper surface and a protective coating on the upper surface of the light sensitive material and a protective coating underneath the base or sheet of material and which protective coating resists chemical milling solutions; and, FIG. 32 is an illustration of the base or sheet of material having the protective coating on its lower surface, sensitized material on its upper surface and the protective coating on top of the light sensitive material with a recess in the upper protective coating in the light sensitive material and a recess in the lower protective coating to allow the chemical milling solution to dissolve part of the sheet of material to form the design of FIG. 26.

THE SPECIFIC DESCRIPTION OF THE INVENTION

Figure 1:
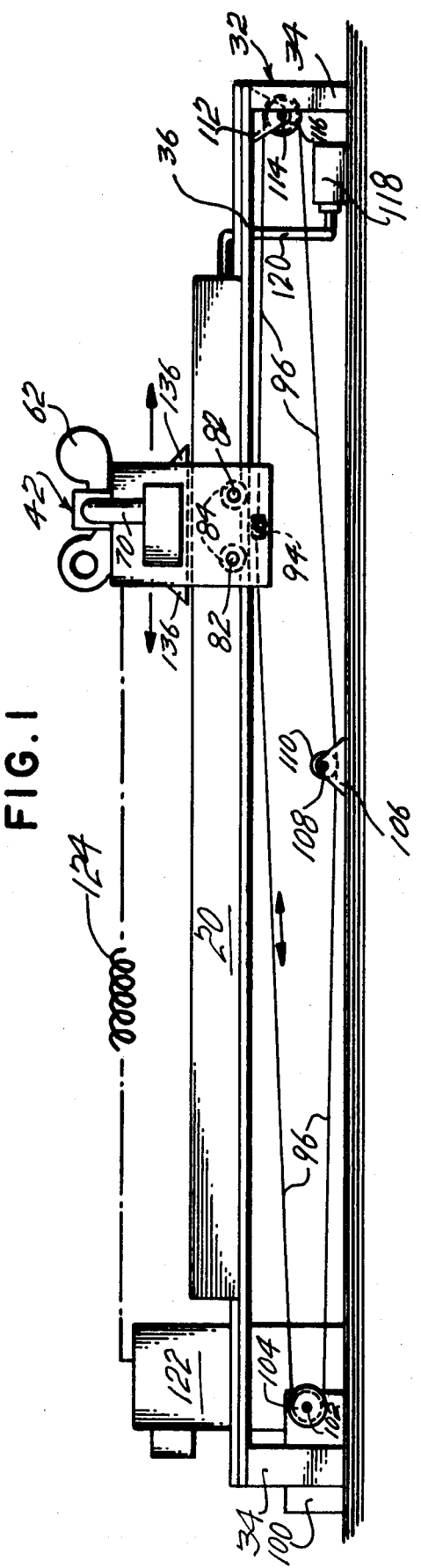
FIG. 1 is a side elevational view of one species of the invention and illustrates the support for the light sensitive copy base, drawing and the moving light source.
Figure 2:
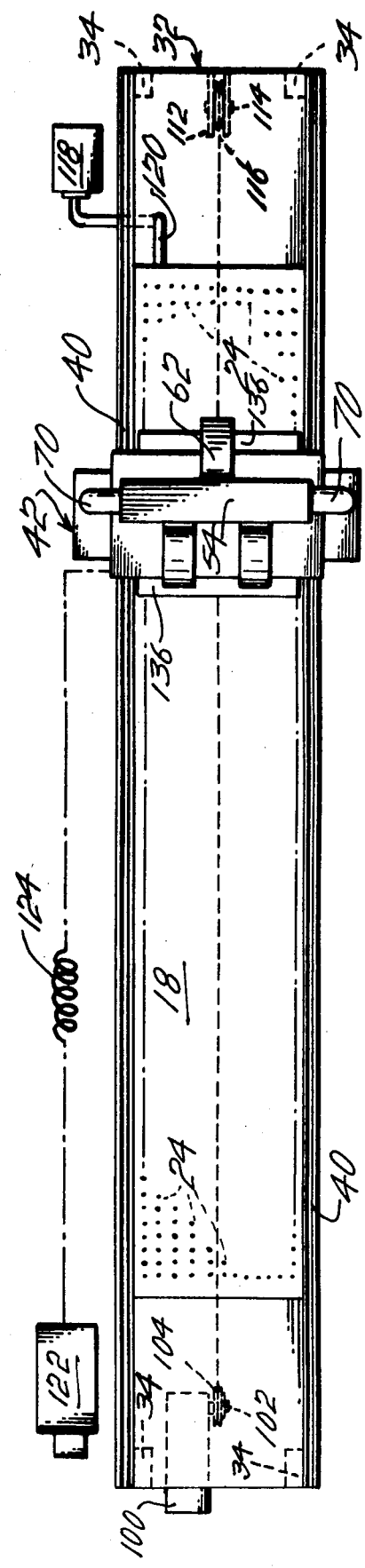
FIG. 2 is a plan view of the species of the invention of FIG. 1.

In FIGS. 1 and 2 there is illustrated a species of the invention showing a support 20. The support 20 comprises an upper member 22 having a series of holes or apertures. Also, the support has sides 26, ends 28 and a bottom 30. In effect, support 20 comprises a sealed housing except for the holes 24 in the upper member 22. There is placed over the upper surface of the upper member 22 a light sensitive copy base, the drawing and the translucent cover.

The support 20 is positioned on a table 32 having legs 34 and a long supporting member 36. The support 20, in one version, is about 16 feet long and about 4 feet wide.

In FIG. 6 it is seen that on the upper surface of the supporting member 36 and adjacent to, but outside of the sides 26 of the support 20, there is a U-guide channel 38 on the left and a U-guide channel 40 on the right. The channels 38 and 40 are positioned so that the channels are directed upwardly.

In FIG. 6 it is seen that there is a housing 42 for a light source 44. The light source 44 is essentially a long tube having light emitting elements. The light source 44 is commercially available. The housing 42 has two upright outside side walls 46. Then, at the upper end of the side walls 46 there is an inwardly directed wall 48. There is positioned on the wall 48 an inward upper side wall 50. In the side wall 50 there is an opening 52. Then, there is positioned on the upper end of the two inner side walls 50 a top wall or cover 54.

In the center part of the top wall 54 there are two downwardly directed interior walls 56 and 58 which define a funnel. In the top wall 54 there is an opening 60. The opening 60 is between the downwardly directed interior walls 56 and 58. There is positioned over the opening 60 a motor and fan 62 for directing air from the outside of the housing 42 into the interior of the housing 42. The interior of the housing 42 may be identified as plenum 64.

On the outside of each upright side wall 46 there is an exit housing 66 having an opening 68 in its lower end.

An exit tube 70 connects with the opening 52 in the side wall 50 and also connects with the exit housing 66.

In FIG. 6 it is seen that on the inside of the upright side walls 46 that there is on the left an electrical adapter 72 and on the right an electrical adapter 74. The adapter 72 and 74 are connecting means for light source 44.

Also, on the inside of the upright side wall 46 there is an angle 76. There is positioned on the angle 76 a translucent shield 78. Between the sides of the shield 78 and the upright side walls 46 there is a sealing compound 80. The translucent shield 78 may be of quartz, glass or other suitable material.

In the lower part of the upright side walls 46 it is seen that there is a pin or shaft 82. In fact, in each side wall 46 there are two pins or shafts 82. Mounted on the inner end of each of the shafts 82 there is a wheel 84. The wheels 84 and the guide channels 38 and 40 roll in the guide channels and restrict the movement of the housing 42, over the support 20, to a rectilinear back and forth movement There is a tie-bar 86. The tie-bar 86 has threaded outer ends 88. The threaded outer ends project through openings or passageways in the lower end of each upright side wall 46. On the outer end of the threaded end 88, and outside of the side wall 46 there is an outer nut 90. On the threaded end 88 and inside of the side wall 46 there is a nut 92. The nuts 90 and 92 definitely position the tie-bar with respect to the upright side walls 46 and housing 42. In the central part of the tie-bar 86 there is a cross-head 94. A cable 96 is fastened to the cross-head 94.

In FIGS. 1 and 2 it is seen that at the left of the table 32 and underneath the supporting memeber 36 that there is a motor 100 having an output shaft 102. There is positioned on the shaft 102 a pulley 104.

Underneath the supporting member 36 there is a lower bracket 106 having a shaft 108. There is a pulley 110 on the shaft 108. At the right of the table 32 and positioned on the supporting member 36 there is a depending bracket 112. A shaft 114 is mounted in the bracket 112. A pulley 106 is mounted on the shaft 114.

The rotation of the shaft 102 with the motor 100 causes the pulley 104 to rotate. This moves the cable 96 and also the housing 42. As a result the light source 44 passes over the materials on top of the upper member 22 of the support 20. As stated previously, the wheels 84 in the U-guide channels 38 and 40 restrict the movement of the housing 42 to a rectilinear movement passing over the support 20. The direction of movement of the housing 42 can be reversed so that it can pass, a number of times, over the support 20 for the exposure of the light sensitive copy base.

In FIG. 2 it is seen that there is a motor pump 118. A tubing 120 connects with the combination 118 and the support 20. The motor and pump combination 118 can evacuate the air in the support 20 to create a vacuum.

Also, in FIG. 2 it is seen that at the left there is a transformer 122 which connects by means of a connecting wire 124 to the housing 42 for supplying electrical energy to the light source 44. The power requirement for light source 44 can be quite large. For example, the power requirement may be 3000 watts or 5000 watts. Also, the light source can be made, on special order, of any specified length. For a light source 44 of extra long length the power requirement can, conceivably, be in a range of 7000 watts or 10,000 watts. It is possible to, commercially, buy a light source 44 in the range of 5000 watts. From this it is seen that the transformer 122 and the connecting wire 124 must be able to accomodate such a large power requirement.

In FIG. 3 it is seen that the housing 42 comprises a rear wall 126 having a lower edge or bottom edge 128. On the outer surface of the rear wall 126 at the lower part thereof there is a lamp shade 130. Also, the housing 42 comprises a front wall 132 having a lower edge or bottom edge 134. On the outer surface of the front wall 132 and near the lower end there is a lamp shade 136.

On the inside surface of the rear wall 126 and the inside surface wall 132 there is the angle 76 for supporting the shield 78. There is a sealing compound 80 between the edge of the shield 78 and the angle 76.

From the foregoing it is seen that the housing 42 in conjunction with the shield 78, the angle 76 of the sealing compound 80 define a plenum for the light source 44. Because of the large power requirements of the light source 44 it is desireable to cool the light source. The motor and fan 62 take air form the outside of the housing 42 and blow it downwardly through the opening 60 and the downwardly directed interior walls 58 and over the light source 44. The air passing over the light source 44 cools the light source and is heated. The hot air leaves the housing 42 through the opening 52, exit tube 70 and the exit housing 66. It may be desirable to direct the hot air from the housing 42 to the atmosphere outside of the building in which the invention is housed. In the winter, for heating purposes, it may be desirable to exhaust the hot air from the housing 42 into the building.

In FIG. 5 there is illustrated the support 20, upper member 22 with the holes 24. There is placed over the upper surface of the upper member 22 the copy base or sensitized base. Then, the drawing 142 is placed over the copy base 140. A translucent cover 144 is placed over the drawing 142 and the copy base 140. With the motor and pump combination 118 evacuating air inside the support 20 the copy base 140, drawing 142 and translucent cover 144 are pressed downwardly onto the upper surface of the upper member 22. This assures a definite positioning of the copy base 140 and the drawing 142 with respect to each other. It is to be noted that the translucent cover 144 extends beyond the outer most holes 24 so as to assure a good vaccum inside of the support 20. The translucent cover 144 is of flexible material such as a sheet of appropriate plastic. One suitable plastic is Mylar. The translucent cover 44 should be flexible so that it can be moved off of the upper member 22 and, if necessary, folded back on itself. Then, the copy base 140 and the drawing 142 can be placed on member 22. The translucent cover 144 then can be placed over the drawing 142 and the copy base 140.

In FIGS. 7 and 8 there is illustrated another means for moving the housing 42. Between the two upright side walls 46 there is a brace 150. In the central part of the brace 150 there is an opening or a passageway 152. A nut 154 is welded into the opening or passageway 152.

In FIG. 7 it is seen that there is a motor 156 connecting with gear box 157. This is on the right end of the table 32. On the left end of the table 32 there is a bearing 158. A screw 159 connects with the gear box 158, passes through the nut 154 and is journaled in the bearing 158. The reader can readily appreciate that with the turning of the screw 159 the housing 42 and the light source 44 will pass over the support 20 to expose the sensitized copy base. With the screw rotating in one direction the housing 42 will move from right to left over the support 20 and with the screw rotating in the other direction the housing will pass from left to right over the support 20. The number of passes of the housing 42 and the light source 44 over the support 20 can be determined to expose the light sensitive copy base.

With the apparatus 18 it is conceivable that any size of drawing can be copied. If, in an extreme situation, it were necessary to copy a drawing 50 feet by 50 feet it is conceivable that the apparatus 18 could be made of such a size as to copy such a drawing. It is possible to have one light source 44. The cost of making a tube 44 of long length is expensive. Therefore, it might be more advantageous to have a number of tubes 44 placed in a staggered and overlapping end-to-end relationship. The ends of the tubes overlap.

A large drawing may be used to make a flat part. For example, see FIG. 9, a sheet of material 160 may be selected. The sheet of material 160 can be metal such as aluminum, steel or other appropriate metal. A chemical 161 can be applied over the surface of the material 160, see step 162, to form a light sensitive copying base. The chemical 161 is photo sensitive and may be the same as used on blue print paper, diazo paper and the like. Then, at step 163 the drawing can be placed over the light sensitive copying base to form a sandwich. At step 164 the drawing and the copying base are subjected to a light source to transfer the characteristics of the drawing to the light sensitive copying base. The copying base on a sheet of material 160 can be processed to the desired configuration at step 165. The sheet of material 160 can be milled or formed to a desired configuration. At step 166 the milling of the sheet of material may be by mechanical milling. At step 167 the milling of the sheet of material may be chemical milling. At step 168 the milling of the sheet of material may be by electrical milling. At step 169 the sheet of material 160 can be formed to the desired configuration by a gas fired cutting torch. Mechanical milling, chemical milling, electrical milling and a cutting torch are well known in the art and are used to form an object of a desired configuration. An example may be the formation of aluminum sheet 160 to a desired configuration. The sheet of aluminum 160 may be 20 feet long and 10 feet wide. It may be necessary to have a particular configuration. To realize this particular configuration the drawing can be transfered to the light copying base on the aluminum sheet 160. Then the aluminum sheet 160 can be milled to the desired configuration. The aluminum sheet will be flat. If necessary, after the aluminum sheet has been formed to the desired configuration the aluminum sheet may be rolled or bent to a configuration other then the flat configuration.

Again, I consider the fact that the apparatus 18 can be made of any reasonable size that a metal object of any reasonable size can be formed. This is possible because of the versitility of the housing 42 and the light source 44. The housing 42 and the light source 44 can be of such a size as to, evenly, expose the light sensitive copying base on the sheet of material 160. Then, the sheet of material 160 can be milled mechanically, chemically, electrically, or by a gas fired cutting torch.

In FIGS. 10, 11 and 12 there is illustrated another species of the invention comprising an overhead suspension system. There is an overhead housing 170. In FIG. 10 it is seen that there is a ceiling or upper support 172. There are vertical support rods 174 depending downwardly from the ceiling 172. These support rods 174 connect with an I-beam 176.

In FIG. 10 it is seen that there is a passageway in the web 178 of the I-beam 176. The threaded end of the vertical rods 174 pass through the passageway. There are nuts 184 on each surface of the web 178 and on the threaded end of the vertical support rod 174. The nuts 184 and the vertical rods 174 can definitely position the I-beam.

In FIG. 11 it is seen that on one end of the web 178 there is a leg 180 and on the other end of the web 178 there is a leg 182.

The overhead housing 170 comprises two spaced apart upright legs 187 and 188 which are joined by an upper connecting member 190. The structure of the overhead housing 170 is the same as the housing 42 and therefore details will not be repeated.

In the upper connecting member 190 are two spaced apart passageways. In each of the spaced apart passageways is a shaft 192. On the inner end of the shaft 192 is a flanged wheel 194. The flanged wheel rides on the upper edge of an appropriate leg 180 or 182 of the I-beam 176. The legs 180 and 182 act as guides for the flanged wheels 194. Again, the legs 180 and 182 and the flanged wheels 194 restrict the motion of the overhead housing 170 to a rectilinear motion. The overhead housing can move over the support 198, a flexible base 200, a copy base 202 a drawing 204 and a translucent cover 206. The apparatus in FIG. 12 is referred to as a vacuum table. The flexible base 200 has a perimeter ridge 208. The flexible base 200 may be a soft rubber or a soft plastic. It is seen that the perimeter ridge 208 in conjunction with the translucent cover 206 and the base 200 define a cavity or a recess for receiving the light sensitive copy base 202 and the drawing 204. Again a vacuum can be applied to the cavity defined by the base 200, perimeter ridge 208 and the translucent cover 206 so that the copy base 202 and the drawing 204 are firmly secured over the base 200.

The I-beam 176 and the overhead housing 170 make it possible to employ apparatus 18 of FIGS. 1 through 6 and also to employ apparatus 168 of FIGS. 10 through 12 in a series relationship. For example, the apparatus 18 and the apparatus 168 can be placed in an end-to-end position. The apparatus 18 can be 24 feet long and the apparatus 168 can be 12 feet long. It is possible to have an overhead housing 170 to pass over the 24 foot long support 20 and the 12 foot long support 198 to expose the appropriate light sensitive copy base. Actually, with the overhead support of FIGS. 1–11 or the I-beam 176 it is possible to have the support 20 and also the support 198 of any length.

The support 198 is positioned on a table 210. The table 210 has upright legs and a supporting member 214.

In FIG. 13 a fragementary vertical cross-sectional view of an overhead housing 170 or a housing 72 there is illustrated two parallel light sources 210. In order to transfer a copy of the drawing to the light sensitive copy base it is often necessary that the overhead housing 170 or the housings 42 travel over the drawing and the copy base a number of times. To reduce the necessity for traveling over the drawing and the copy base a number of times there may be used two parallel light sources 210. From the consideration of reducing the number of times the overhead housing passes over the drawing and the copy base two parallel light sources are desirable. For example, with the support 20 and the support 198 in an end-to-end relationship and the support 20 being 24 feet long and support 198 being 12 feet long it its desirable to have as few trips as possible of the overhead housing 170 over the supports. For this reason two parallel light sources 210 may be in the same housing 170.

In FIGS. 14, 15 and 16 there is illustrated a drive means for the overhead housing 170. There is welded, on the underneath surface of the web 178, at the right end, see FIG. 14, a motor and gear box 214. At the left of the I-beam 176 there is a vertical depending flange 216. A bearing 218 is welded to this vertical depending support flange 216. A bearing and nut combination 220 is positioned on the upper surface of the overhead housing 170. This combination 220 comprises a passageway 222. In the passageway 222 there is a nut 224. A screw 226 connects with the motor and gear box 214 and screws through the nut 224 and is journaled in bearing 218. Naturally, with the turning of the screw 226 the overhead housing 170 moves along the I-beam 176. The overhead housing 170 is restricted to movement on the I-beam 176 because of the flanged wheels 194 and the legs 180 and 182 of the I-beam. By reversing the direction of rotation of the screw the direction of movement of the housing 170 can be reversed. Naturally, the housing can move back and forth a number of times over the support 198 and thereby over the copy base 202 and the drawing 204.

In FIG. 14 it is seen that at the right of the support table that there is a transformer 228, if necessary, and a wire 230 connecting the transformer 228 and the motor and gear box 214.

In FIGS. 17 and 18 there is illustrated another means for moving the overhead housing 170. It is seen that there is positioned on the top wall 54 a pedestal 240. In FIG. 18 the pedestal 240 is of a U-configuration with the legs directed upwardly. There is positioned on the pedestal 240 a base 242. There is positioned on the base 242 a motor mount 244. On the motor mount 244 is an electric motor 246.

There is a gear box 248 on each side of the electric motor 246. A shaft 250 connects the electric motor 246 with the gear box 248. The reader is to understand that the electric motor has two output shafts 250. The gear box 248 has an output shaft 254 or a second shaft 254.

There is an upright side plate 255 on each side of the base 242. These two side plates are spaced apart. In each of the side plates there is a passageway or a hole near the lower front left side, see FIG. 18. There is a bearing 252 in this passageway. The second shaft 254 is journaled in the bearing.

On the outer end of the shaft 254, and outside of the side plate 255, there is a sprocket 256. Again, the reader is to understand, see FIG. 17, that there is a sprocket 256 on the outside of each side plate 255.

In the upper forward part of each side plate 255 there is a hole or passageway. There is a third shaft 258. There is a bearing 260 in the hole or passageway. The third shaft 258 is journaled in the bearing 260. On the outer end of the third shaft 258, and outside of the side plate 255, there is a sprocket 261. On the inner end of the third shaft 258 and inside of the side plate 255 there is the flanged wheel 194. The flanged wheel 194 rides on the upper edge of a leg of the I-beam 176.

In the right upper rear part of the side plate 255 there is a passageway. There is a bearing 262 in the passageway. A fourth shaft 264 is journaled in the passageway. On the outer end of the fourth shaft 264 and outside of the side plate 255 there is a sprocket 266. On the inner end of the fourth shaft 264 and inside of the side plate 255 there is a flanged wheel 194. Again, the flanged wheel 194 rides on the upper edge of a leg of the I-beam 176.

In the lower right part of the side plate 255 there is a shaft 268. An arm 270 is free to rotate on said shaft. On the free end of the arm 270 there is a shaft 272. A sprocket 274 is positioned on the shaft 272. Near the lower right side of the side plate 255 there is a pin 276. In the central part of the arm 270 there is a hole or passageway 278. A spring 280 connects with the hole 278 and also with the pin 276.

A chain 284 runs around the outside of the sprockets 256, 261, 266 and 274. From the above description it is seen that the sprocket 256 is a driving sprocket. Sprockets 261, 266 and 274 are idler sprockets. Also, sprocket 274 is a tensioning sprocket for the chain 284.

Again, the reader is to realize that on the outside of each side plate 255 there are the sprockets 256, 261, 266 and 274 to make two sets of sprockets for driving the overhead housing 170 on the I-beam 176.

The electric motor 246 connects with a suitable source of electricity and can be activated to move the overhead housing 170 from the right to left and then the motor 246 can be activiated to move the overhead housing from left to right. This can be repeated as many times as necesary to expose the light sensitive copy base for copying the drawing.

In FIGS. 19 and 20 there is illustrated another species of the invention wherein there are two housing units 42. In these figures it is seen that there is a long supporting member 290. The structure of the components of FIGS. 19 and 18 is similar to the structure of the components of FIGS. 1-8. Therefore, where applicable, the same reference numerals will be used. In FIGS. 1-8 there was one housing 42. In FIGS. 19 and 20 there are two housings 42. The reason for the two housings 42 is that it will take one-half the time to expose the drawing in the apparatus of FIGS. 19 and 20 as compared to the apparatus of FIGS. 1-8. The reason for this is that there is a light source in each of the housings 42 of FIGS. 19 and 20. In FIGS. 1-8 there is one light source.

In FIGS. 19 and 20 the pulley arrangement for moving the supports 20 to the housing 42 is somewhat different than the pulley arrangement in FIGS. 1-8.

In FIGS. 19 and 20 it is seen that there are two depending pulley brackets 292. There is one pulley bracket associated with each support 20 and corresponding housing 42. With each depending pulley bracket 292 there is a shaft 294. Mounted on each shaft 294 is a pulley 296.

At the left of the long supporting member 290 there is a motor and pulley combination. A cable 96 connects this motor and pulley combination and with the far right pulley bracket 292 and 296.

At the right of the long supporting member there is a motor and pulley combination. A cable 96 connects with this motor and pulley combination and runs around the far left pulley bracket 292 and pulley 296.

Again, the same reference numerals are used with the same components of FIGS. 19 and 20 as were used with the same components of FIGS. 1-8.

With two traveling light sources, the exposure time for the drawing for the apparatus of FIGS. 19 and 20 is one-half the exposure time of the apparatus of FIGS. 1-8.

In FIGS. 21, 22 and 23 there is illustrated a portable unit 300 having an overhead suspension system. The portable unit 300 comprises the base 302. There are numerous shafts 304 connecting with the base 302. On the shaft 304 are wheels 306. There is an upright standard 308 connected with the base 302. Also, there are struts connecting with the base 302 and the upright standard 308.

On the upper end of the upright standard 308 there is an arm 312 overlying the base 302. A strut 314 connects with the upper part of the upright standard 308 and the arm 312.

From the arm 312 there are depending supports 316. On the lower end of the depending supports 316 there is an I-beam 176. As explained with FIGS. 16 through 18 the I-beam 176 has a web 176 and two legs, 180 and 182. There is positioned on the I-beam 176 a traveling carriage 236. The reference numerals used with FIGS. 17 and 18 for the traveling carriage 236 will be used for FIGS. 21-24. The same reference numerals will be used for the same components.

There is a table 320. Part of the table 320 is supporting member 324. The drawing can be placed on the supporting member 324. Then, the portable unit 300 can be moved to be juxtapositioned to the table 320, see FIGS. 21-23, and the I-beam 176 placed over the supporting member 324. The traveling carriage 236 can move from the I-beam 176. With the movement of the traveling carriage 236 the overhead housing 170 moves over the supporting member 324 and over the drawing on the member 324.

The traveling overhead housing 170 of FIGS. 10, 11, 14 15, 16, 17 and 18 with the supporting I-beam 176 was designed for use with the table 24 feet long in series with the table 16 feet long. With FIGS. 21-23 the supporting I-beam 176 is designed for use with the table 4 feet long or 6 feet long or 8 feet long.

In FIG. 25 there is illustrated a system which can be placed on the upper surface of the supporting member 324 the table 320. This system is referred to as a vacuum table.

It is seen that there is a supporting member 324 having a number of through passageways 326. On top of the supporting member 324 there is a plastic or rubber mat 328 comprising a base 330. The base 330 at the right comprises an edge 332. There are two upwardly projecting ridges. There is an inner compressible ridge 334 and an outer compressible ridge 336.

On the upper surface of the base 330 there is placed a light sensitive copy base which may be paper having a light sensitive material on the upper surface, or an appropriate sheet of material having a light sensitive material on its upper surface. Then, the drawing 142 is placed over the copy base 140. The drawing 142 comprises design 338. There is placed over the drawing 142 and the light sensitive copy base 140 a cover glass 340. This cover glass is placed over the base 330 so that its outer edges rest on the inner compressible ridge 334 and the outer compressible ridge 336.

Below the supporting member 324 there is an airtight housing 342. A motor and vacuum pump combination 344 connect with the airtight housing 342. In the base 330 is a number of passageways 348.

In operational use the light sensitive copy base 140 is resting on the upper surface of the base 330. The drawing 142 is resting on the upper surface of the copy base 140. The cover glass 340 is placed over the drawing 142 and with the outer edges of the cover glass 340 resting on the compressible ridges 334 and 336.

By activating the motor and pump combination 344 the pressure in the airtight housing 342 is reduced. With the reduction of the pressure in the housing 342 the pressure in the void defined by the base 330, the compressible ridges 344 and the cover glass 340 is reduced. The copy base 140 is forced against the upper surface of base 330. The drawing 142 is forced against the upper surface of the copy base 140. The cover glass 340 is forced against the compressible ridges 334 and 336. The reader is to understand that the compressible ridges 334 and 336 extend around the periphery of the base 330 and are continuous. Also, the cover glass 340 rests on the compressible ridges 334 and 336.

In the foregoing manner the copy base 140 and the drawing 42 are pressed firmly against the base 330. The cover glass 340 may also be pressed firmly against the drawing 142.

In FIG. 24 there is illustrated a housing 352 for light sources. The housing comprises a first end 453 and a second end 356. It also comprises a first side 358 and a second side 360.

On the inside of the first end 354 there is a first adapter 362. On the inside of the second side 360 there is a second adapter 364. A first light 366 is positioned in the adapters 362 and 364.

On the inside of the second end 366 there is a third adapter 368. On the inside of the first side 358 there is a fourth adapter 370. A second light 372 is positioned in the two adapters 368 and 370.

It is possible to use one large long light in the housing 352. However, the cost of one large light, say 10 feet long, is a high cost. The manufacturer will make the large long light. However, the cost may be prohibitive. Therefore, it is possible to use two shorter lights, viz., 366 and 372. These two lights are standard commercial products and together cost less than one large long light. In order to have a satisfactory distribution of light the first light 366 and the second light 372 it is desirable that the first light 366 and the second light 372 overlap to a small degree. If the overlap is too great then there will be a burning of the light sensitive paper and there will be hot spots on the developed light sensitive paper. With the first light 366 and the second light 372 overlapping the proper degree there will be no hot spots on the light sensitive paper and the design will be transferred uniformly to the light sensitive paper. Again, the reason for two or more lights in the housing 352 is an economical reason as the two lights can be commercially available and it is not necessary, at an enhanced cost, to manufacture a special light.

In FIG. 9 there was illustrated a flow plan for transferring a drawing to a copy base. The sheet of material can be metal. Also, the sheet of material can be of such a size that it is desirable to transfer the drawing to the sheet of metal and then to mill the sheet of metal to produce the desired configuration from the sheet of metal. In FIG. 26 there is illustrated a drawing 380 having a design 382.

In FIG. 37 there is illustrated the method of transferring the design 382 to a base or substrate 384. The base or substrate 384 can be metal such as aluminum, steel, stainless steel and the like. It is conceivable that the base or substrate 384 can be some material other than metal and that material may be a suitable plastic. As illustrated in FIG. 9 a light sensitive material 386 is placed on the upper surface of the base or substrate 384. Then the drawing 380 is placed over the light sensitive material. A cover 388 is placed over the drawing 380. The purpose of the cover 388 is to make sure that the drawing 380 is pressed firmly against the light sensitive material 386. Then a source of light 390 will activate the light sensitive material 386 to receive the design 382 of the drawing 380.

In FIG. 28 there is illustrated a method for cutting the design 382 from the base or substrate 384. It is seen that there is a cutting torch 392 having a cutting flame 394. The fuel for the cutting torch 392 and the cutting flame 394 can be acetylene. The cutting flame will cut through the light sensitive material 386 and also through the base or substrate 384 as illustrated 395. To the left of the cut 396 there is a discarded member 398. To the right of the cut 396 there is a retained member 400. In this manner the cutting flame 394 can be used to cut the design 382 out of the base or substrate 384.

In FIG. 29 there is illustrated a method for using electrodes 402 and 404 to form the cut 396. The electrodes will pass electrical energy between them and will have such a large amount of electrical energy that the base or substrate 384 will vaporize to form the cut 396. With the cut 396 there is the discarded member 398 and the retained member 400. The art of electrical milling has been developed for a number of years. Electrical milling apparatus is commercially available.

In FIGS. 28 and 29 the reader is to understand that the cutting flame 394 and also the electrodes 402 and 404 follow the outline of the design 382 on the developed light sensitive material 386. By following the outline of design 382 the discarded member 398 can be severed from the retained member 400.

The reader is to understand that in FIGS. 28 and 29 there is a schematic illustration. A cutting flame 394 has been used for years to cut metal. Also, electrodes 402 and 404 have been used for years to form metal to a desired configuration. There are numerous commercial sources for the cutting torch 392 and the cutting flame 394. Likewise, there are commercial sources for the technology and electrodes 402 and 404 for shaping a piece of metal by means of electricity.

In FIG. 30 there is illustrated the base of substrate 384 having the light sensitive material 386 on the outside surface. The severing means 406 such as a saw can be used for making the cut 396 and the base 384. With the cut 396 made by the severing means 406 there is formed the discarded member 398 and the retained member 400.

In FIGS. 31 and 32 there is illustrated a method for chemically forming the retained member 400. There is placed over the upper surface of the light sensitive material 386 a protective chemical coating 408. There is placed below the base 384 a protective chemical coating 410. The coatings 408 and 410 are resistent to With the coatings 408 and 410 resistent to the chemical milling solutions it is necessary to expose the base or substrate 384 so that the chemical milling solution can act on the base. Therefore, it is seen that in FIG. 32, that in the upper protective coating 408 and in the light sensitive material 386 there is a recess 412 following the outline of the design 382. Likewise, in the lower protecting coating 410 there is a recess 414 following the design of the drawing 382. The reader is to understand that the recess 414 may be eliminated and that only the recess 412 be used. By immersing the base or substrate 384, the sensitized material 386, the protective coatings 408 and 410 and the chemical milling solution, the base 384 is eaten away by the milling solution or corroded by the milling solution to form the discarded member 398 and the retained member 400. Again, there are numerous chemical milling solutions and techniques, commercially available, for acting on the base or substrate 384 so as to form the discarded member 398 and the retain member 400. Some reference patents for chemical milling, for illustrative purposes, are U.S. Pat. Nos. 2,940,838; 2,981,610; and, 3,042,566.

Further, the techniques illustrated in FIGS. 9 and 26-32 can be used for a large sheet of material. To repeat, it is conceivable that it may be desirable to have a design 382 measuring 40 or 50 feet long and 20 feet across. With the teachings of FIGS. 9 and 26-32 it is possible to prepare the design 382 from a base or substrate 384. The base or substrate 384 will be flat. Therefore, the retained member 400 will be flat. After the retained member 400 has been formed then it can be bent and curved and twisted to a desired curvature.

From the foregoing it is seen that I have provided a copying system having an even distribution of light in the copying of a drawing on a light sensitive copy base. There are no hot spots on the copy base so the copy base is evenly exposed. The source of light moves over the drawing and the light sensitive copy base.

The light source must have a length at least as long as the width of the design on the drawing. Preferably, the light source should be longer than said design. A translucent cover for covering said object so that said object is positioned between said support and said cover with the translucent cover having a width greater than the width of said object and the translucent cover having a length greater than the length of said object, a cooling means for said light source, and a guide means for directing the movement of said light source with respect to said supports. To the best of my knowledge no one else has provided such an easel.

Also, I have provided a method for transferring a drawing to a copy base by placing said copy base on a support, placing said drawing on said copy base so that said copy base is between said support and said drawing, forcing said copy base toward said support and forcing said drawings toward said copy base, portioning a light source close to said drawing to illuminate said drawing and said copy base and moving said light source with respect to said drawing and said base to evenly illuminate said drawing and said copy base. Then, I do not know of anyone teaching of said method for transferring a drawing to a copy base.

Also, I have provided a method for tranferring a drawing to a material whereby a sheet of material is selected, a chemical is applied to said material to form a copy base which is sensitive to light, placing said copy base on a support, placing said drawing and said copy base so that said copy base is between said support and said drawing, forcing said copy base towards said support and forcing said drawing towards said copy base, positioning a light source close to said drawing to illuminate said drawing and said copy base and moving said light source with respect to said drawing in said base to evenly illuminate said drawing and said copy base.

Further, I have provided a portable light source whereby it is possible to move the portable source to a vacuum table used for copying a drawing and also for moving a portable light source away from the vacuum table.

In addition, I have provided a relatively inexpensive copying apparatus.

Another important advantage of this invention is that the copy of the drawing is not distorted as the drawing and the copy base are flat when exposed to the moving light source. The drawing and the copy base do not have to travel around a curve when being exposed to a light source. With the travel around the curve the drawing is somewhat distorted and also the copy base is distorted. The result is a distorted copy of the drawing. With my apparatus the drawing and the copy base are flat when being exposed and there is no distortion in the copy base and no distortion of the drawing.

In preparing this patent application I did not make a patent search. I have worked in the copying field for a number of years. I have made my living by copying drawings and making blueprints and the like. From my knowledge of the copying business I have not seen a similar apparatus.

What I claim is:

1. An easel for use in the copying of an object, said easel comprising:
    a. a support;
    b. said support being capable of receiving an object;
    c. a vacuum means for positioning said object on said support;
    d. a light source;
    e. a moving means for moving said light source over said support;
    f. said light source comprising a housing;
    g. said housing having side walls and a top wall defining an opening in the lower part;
    h. a translucent shield operatively connecting with said side walls to define a plenum chamber;
    i. a high intensity light in said plenum chamber and positioned above said translucent shield and below said top wall;
    j. a first means to introduce a cooling fluid into said plenum chamber to cool said high intensity light; and,
    k. a second means to remove said cooling fluid after it has cooled said high intensity light from above said translucent shield and from said plenum chamber.

2. An easel for use in the copying of an object according to claim 1, said easel comprising:
    l. said support being capable of receiving a copy base on its upper surface, an object to be copied positioned over said copy base, and a translucent cover over said copy base and said object to be copied; and,
    m. said vacuum means operatively connecting with said support to decrease the gaseous pressure between said support and said translucent cover to allow air pressure to force said copy base, said object to be copied and said translucent cover to be moved toward said support.

3. An easel for use in the copying of an object according to claim 1, said easel comprising:
    l. a guide means for guiding and for directing the movement of said light source over said support.

4. An easel for use in the copying of an object according to claim 3, said easel comprising:
    m. said guide means comprising two spaced apart guides juxtapositioned to said support; and,
    n. said light source having guide followers for cooperating with said two spaced apart guides for guiding the movement of said light source over said support.

5. An easel for use in the copying of an object according to claim 4, said easel comprising:
    o. said guide means being channels juxtapositioned to said support; and,
    p. wheels operatively connecting with said housing and in said channels for guiding the movement of said light source over said support.

6. An easel for use in the copying of an object according to claim 4, said easel comprising:
    o. said side walls depending downwardly below said support on each side of said support;
    p. a tie-bar connecting opposed side walls, underneath said support; and,
    q. said moving means connecting with said tie-bar, underneath said support.

7. An easel for use in the copying of an object according to claim 6, said easel comprising:
    r. said moving means comprising a cable connecting with said tie-bar; and,
    s. said means for moving said cable for moving said light source over said support.

8. A easel for use in the copying of an object according to claim 6, said easel comprising:
    r. said moving means comprising a screw operatively connecting with said tie-bar; and,
    s. a means for turning said screw for moving said light source over said support.

9. An easel for use in the copying of an object according to claim 3, said easel comprising:
    m. said guide means comprising a leg above said support;
    n. a guide follower connecting with said housing;
    o. said guide follower operatively connecting with said leg;
    p. said housing depending from said guide follower; and,
    q. said guide means and said guide follower direct the movement of said light source over said support.

10. An easel for use in the copying of an object according to claim 9, said easel comprising:
    r. said leg having a surface for receiving said guide follower;
    s. said guide follower comprising a wheel;
    t. said wheel being capable of rolling on said surface of said leg; and,
    u. said leg operatively connecting with an overhead support and being suspended from said overhead support.

11. An easel for use in the copying of an abject according to claim 10, said easel comprising:
    v. said overhead support being part of a portable unit;
    w. said portable unit having a base;
    x. moving means operatively connecting with said base to allow said portable unit to move;
    y. an upright standard operatively connecting with said base;
    z. an arm operatively connecting with said upright standard; and,
    aa. said arm being part of said overhead support.

12. An easel for use in the copying of an object according to claim 1, said easel comprising:
    l. a plurality of lights in said plenum chamber and positioned above said translucent shield and below said top wall.

13. An easel for use in the copying of an object according to claim 1, said easel comprising:
    l. said light source comprising a plurality of said housings; and,
    m. a high intensity light in each of said housings.

14. An easel for use in the copying of an object according to claim 1, said easel comprising:
    l. said light source comprising a plurality of said housings; and,
    m. a plurality of high intensity lights in each of said housings.

15. An easel for use in the copying of an object according to claim 2, said easel comprising:

l. said light source having a length at least as long as the width of said object;

m. said translucent cover having a width greater than the width of said object; and, n. said translucent cover having a length greater than the length of said object.

16. An easel for use in the copying of an object according to claim 2, said easel comprising:

l. said translucent cover having a width, approximately as wide as the width of said support; and, m. said translucent cover having a length, approximately as long as the length of the subject.

17. An easel for use in the copying of an object according to claim 2, said easel comprising:

n. a guide means for guiding and for directing the movement of said light source over said support; and, o. a plurality of lights in said plenum chamber and positioned above said translucent shield and below said top wall.

18. An easel for use in the copying of an object according to claim 2, said easel comprising:

n. said light source comprising a plurality of said housings; and, o. a high intensity light in each of said housings.

* * * * *